United States Patent

Seki et al.

[11] Patent Number: 5,974,096
[45] Date of Patent: Oct. 26, 1999

[54] DIGITAL QUADRATURE DETECTION CIRCUIT

[75] Inventors: Kazuhiko Seki; Takayoshi Kaneko, both of Tokyo, Japan

[73] Assignee: Pacific Communications Research Corporation, Tokyo, Japan

[21] Appl. No.: 08/855,584

[22] Filed: May 13, 1997

[30] Foreign Application Priority Data

Sep. 12, 1996 [JP] Japan .................................. 8-240905

[51] Int. Cl.⁶ .................................................. H03D 1/00
[52] U.S. Cl. ............................ 375/340; 375/280; 375/332
[58] Field of Search .................................. 375/279, 280, 375/261, 316, 322, 329, 340, 355, 371, 332, 269; 329/304, 305, 306, 309

[56] References Cited

U.S. PATENT DOCUMENTS

| | | | |
|---|---|---|---|
| 5,241,567 | 8/1993 | Shimakata | 375/82 |
| 5,313,170 | 5/1994 | Kojima | 329/306 |
| 5,406,218 | 4/1995 | Ishihara et al. | 329/346 |
| 5,426,669 | 6/1995 | Yamamoto et al. | 375/340 |
| 5,574,399 | 11/1996 | Oura et al. | 329/306 |
| 5,578,947 | 11/1996 | Kojima | 327/7 |

FOREIGN PATENT DOCUMENTS

| | | |
|---|---|---|
| 58-105659 | 6/1983 | Japan . |
| 63-200652 | 8/1988 | Japan . |
| 1-171349 | 7/1989 | Japan . |
| 2-76348 | 3/1990 | Japan . |
| 3-128550 | 5/1991 | Japan . |

*Primary Examiner*—Chi H. Pham
*Assistant Examiner*—Emmanuel Bayard
*Attorney, Agent, or Firm*—McDermott, Will & Emery

[57] ABSTRACT

An object is to provide a digital quadrature detection circuit wherein, without making the circuit complicated and without lowering performance, the operating frequency can be lowered and power consumption can be reduced. There are provided: a quasi-synchronous detector that takes the exclusive logical sum of a binary-converted intermediate frequency signal and a carrier signal, sampling means that respectively sample the output of the quasi-synchronous detector at M phases (where M is an integer of 1 or more) for each symbol, a bit adder that generates an M-bit parallel signal from the output signals of these, and low-pass filters that extract the low frequency components from this output. Whereas conventionally a 100-times clock pulse was employed in order to obtain an M-bit parallel signal, in this case, a 20-times clock pulse is sufficient, due to the provision of five sampling means.

4 Claims, 8 Drawing Sheets

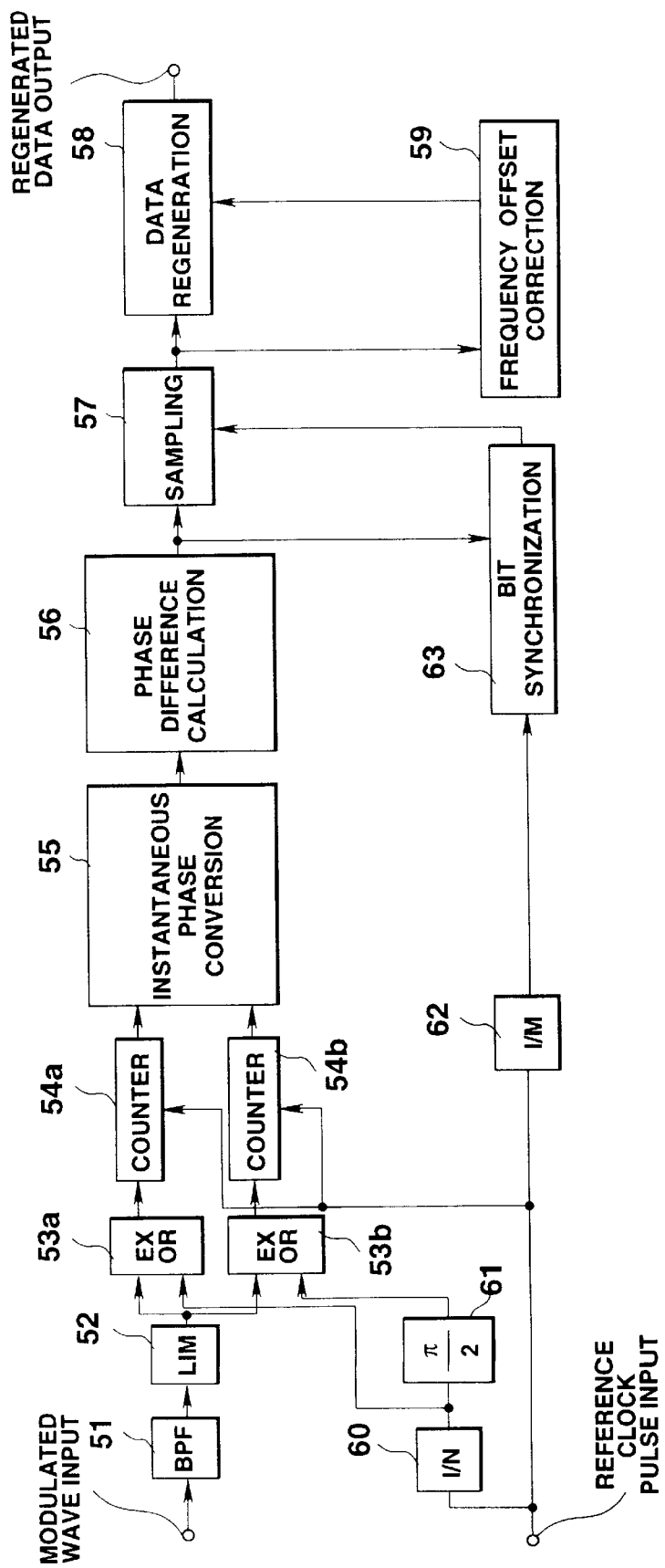
FIG.9 *PRIOR ART*

DIGITAL QUADRATURE DETECTION CIRCUIT

BACKGROUND OF THE INVENTION

1. Field of the Invention

The present invention relates to a demodulator that demodulates a digital modulated signal, and more particularly to a digital quadrature detection circuit that effects conversion on mutually orthogonal baseband signals from an intermediate frequency signal.

2. Description of the Related Art

In recent years, digital communication systems have become common in mobile communication such as PHS (personal handy phone system), and, with this, there has been a demand for receivers of high performance but small size and of low power consumption. One well known system for digital communication suited for mobile communication is π/4 shift QPSK (quadrature phase shift keying). QPSK is a system whereby data from the transmission end are arranged in four phases i.e. 0°, 90°, 180°, 270° (or 45°, 135°, 225°, 315°), and rotated by 45° in each case with every symbol. In order to effect correct demodulation of the signal of such a system, at the receiving end there are prepared two carrier waves differing in phase by 90°, and a quadrature receiver is employed to demodulate with these respectively. The outputs obtained by demodulation by these carrier waves are termed the in-phase component and quadrature component.

FIG. 9 is a functional block diagram of a prior art digital quadrature detection circuit disclosed by Y. Yamamoto et al "Experimental Study of π/4 Shift QPSK Burst Demodulator" at the 1992 Electronic Information Communication Association of Japan Autumn Congress B-245. This digital quadrature detection circuit employs a pulse counting system, and, in contrast to an analogue quadrature detection circuit, the detector is constituted without using analogue components such as mixer, low-pass filter or A/D converter.

In FIG. 9, a signal received by an antenna, not shown, is input to a bandpass filter (BPF) 51. BPF 51 extracts only signals in the desired band and outputs these to limiter 52. The signal, whose amplitude has been restricted by limiter 52, is subjected, in-phase comparators (EXOR) 53a, 53b, to phase-comparison with two reference signals, namely, an in-phase reference signal and a quadrature reference signal, generated by a π/2 (90°) phase shifter 61 and a frequency divider 60 that divides the reference clock pulse by 1/N in frequency. The outputs are then detected by counting for a fixed period by means of a reference clock input which is of sufficiently high rate with respect to the IF signal, in counters 54a, 54b. Instantaneous phase converter 55 then converts the in-phase and quadrature phase detection signals to instantaneous phases and phase difference calculator 56 then performs phase comparison with the signal one symbol previous, to produce a phase difference signal. This phase difference signal is then output to a bit period detector 63 as a bit reference signal, and is sampled at the period of the regeneration symbol clock by sampling means 57. The data is then regenerated by data regeneration means 58 whilst being corrected by frequency offset correction means 59.

However, in order to achieve miniaturisation and reduction of power consumption of the digital demodulator, it is most effective to eliminate or reduce the number of analogue components and A/D (analogue to digital) converters that effect the conversion from analogue to digital. The circuit shown in FIG. 9, in which a hard-limited IF signal is input in single-bit quantized form can cope with such demands and has the excellent advantages that it does not require an A/D converter and the quadrature of the carrier signal is stable.

With the conventional digital quadrature detection circuit of FIG. 9, the detector is constituted without employing analogue components such as mixer, low-pass filter or A/D converter, the demodulator can be miniaturised and some degree of reduction of power consumption can be achieved. However, in order to avoid lowering the error rate characteristic of the demodulator, in this system, counters 54a, 54b have to be operated with a high-rate clock of about 100 times the symbol clock frequency. As a result, the power consumption of the digital quadrature detection circuit of FIG. 9 comes to represent the largest share of the power consumption of the demodulator as a whole. Thus demands for further reduction in power consumption of the demodulator cannot be met.

SUMMARY OF THE INVENTION

With the foregoing in view, it is an object of the present invention to provide a digital quadrature demodulation circuit wherein the operating frequency can be kept low and power consumption reduced without making the construction complicated and without adversely affecting performance.

A digital quadrature detection circuit according to the present invention comprises a quasi-synchronous detector that takes the exclusive logical sum of a binary-converted intermediate frequency signal and a carrier signal; conversion means that converts the output of the quasi-synchronous detector to an M-bit parallel signal by respective sampling in M phases (where M is an integer of one or more) for each symbol; a low-pass filter that extracts the low frequency components from the output of the conversion means; and a timing generating means that generates an operating timing signal and supplies this to the conversion means and the low-pass filter.

The quasi-synchronous detector performs synchronous detection by phase comparison of the intermediate frequency signal with the in-phase or quadrature reference signal. The conversion means converts this output to an M-bit parallel signal. The low-pass filter extracts the desired signal by for example performing a moving average. The timing generating means generates the necessary timing signal.

In a digital quadrature detection circuit according to the present invention, the timing generating means generates M timing signals of mutually different phase for each symbol, and the conversion means comprises M samplers that respectively sample signals of the corresponding timing on receipt of the M timing signals, and a bit adder that performs addition processing on receiving the output of the plurality of samplers.

The conversion means comprises a set of M samplers. These samplers are actuated in response to M timing signals that are offset by prescribed time intervals, so as to sequentially sample the output of the quasi-synchronous detector. The bit adder receives these M outputs and assembles them into a parallel signal of prescribed bit number corresponding thereto (minimum integer of log (M) or more based on 2).

In a digital quadrature detection circuit according to the present invention, the low-pass filter comprises: delay means that receives the output of the conversion means and delays the signal corresponding to a prescribed period (in the example of the embodiment, by 60 samples in the case of 100 samples/symbol); a subtractor that subtracts the output of the delay means from the output of the conversion means; an integrator that integrates the output of the subtractor; a holding circuit that holds the output of the integrator; and a control circuit that corrects the output of the integrator when the result of the calculation of the integrator exceeds a predetermined range.

The result of the integration is employed to correct the data so that the control circuit can perform processing normally if there is for example overflow or underflow of data.

In a digital quadrature detection circuit according to the present invention, the control circuit subtracts the output of the subtractor from the value held by the holding circuit when the result of the calculation of the integrator exceeds a predetermined range.

Data correction is effected by subtracting the output of the subtractor from the value held by the holding circuit.

In a digital quadrature detection circuit according to the present invention, the control circuit holds the output of the subtractor in the holding circuit when the result of the calculation performed by the integrator exceeds a predetermined range.

Correction of the data is performed by holding the output of the subtractor in the holding circuit.

In a quadrature detection circuit according to the present invention, if the symbol rate is f, the frequency corresponding to the time resolution necessary to process the input signal of the digital quadrature circuit is Nf, and the frequency corresponding to the time resolution required for the output signal of the digital quadrature circuit is nf (N>n), the sampling number M per symbol satisfies the relationship M=N/n.

N and n are selected such that the error rate characteristic of the demodulator is not impaired. For example, if N=100, n=2, 4, 5, 10, 20, 25 or 50 and if N=96, n=2, 3, 4, 6, 8, 12, 16, 24, 32, or 48. For example, if the output signal of the quadrature detection circuit is about 20 times the symbol rate, if the input signal needs a time resolution of about 100 times the symbol rate, M=N/n=100/20=5.

In a digital quadrature detection circuit according to the present invention, N and n are fixed such that the power consumption of the circuit is reduced within the range of restriction of the time resolution of the output signal and the time resolution of the input signal.

The restriction range of the time resolution is determined for example by the following conditions. If M is increased, the time resolution of the input signal increases or the time resolution of the output signal falls. That is, if the time resolution with respect to the input signal is made constant, the operating rate of the quadrature detection circuit can be lowered.

The power consumption is subject to for example the following relationships. If M is increased, the circuitry is increased and power consumption is also increased. If n is reduced the power consumption is decreased. In this case, N and n are determined by an overall evaluation regarding the increase or decrease of power consumption entailed by n and the increase or decrease of power consumption entailed by M.

BRIEF DESCRIPTION OF THE DRAWINGS

FIG. 9 is a block diagram of a prior art digital quadrature detection circuit.

DESCRIPTION OF THE PREFERRED EMBODIMENTS

Figure 1:
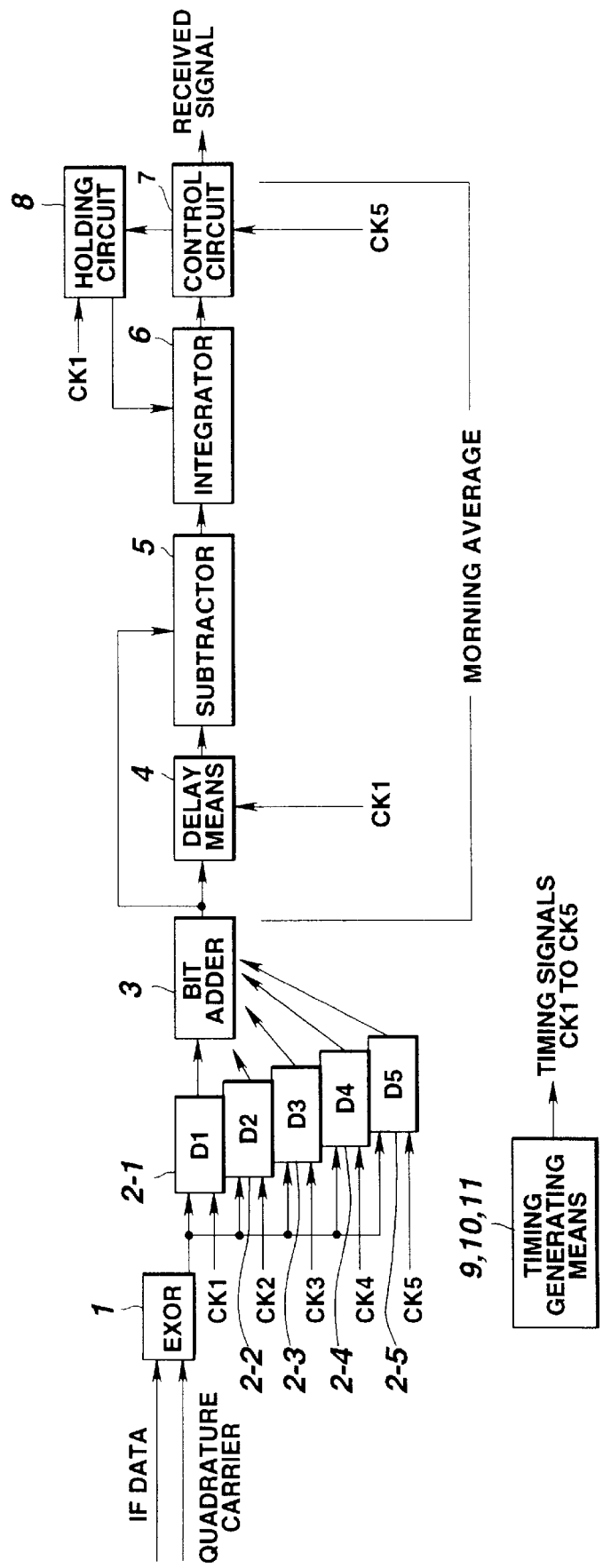
FIG. 1 is a block diagram of a digital quadrature detection circuit according to embodiment 1 of the present invention.
Figure 2:
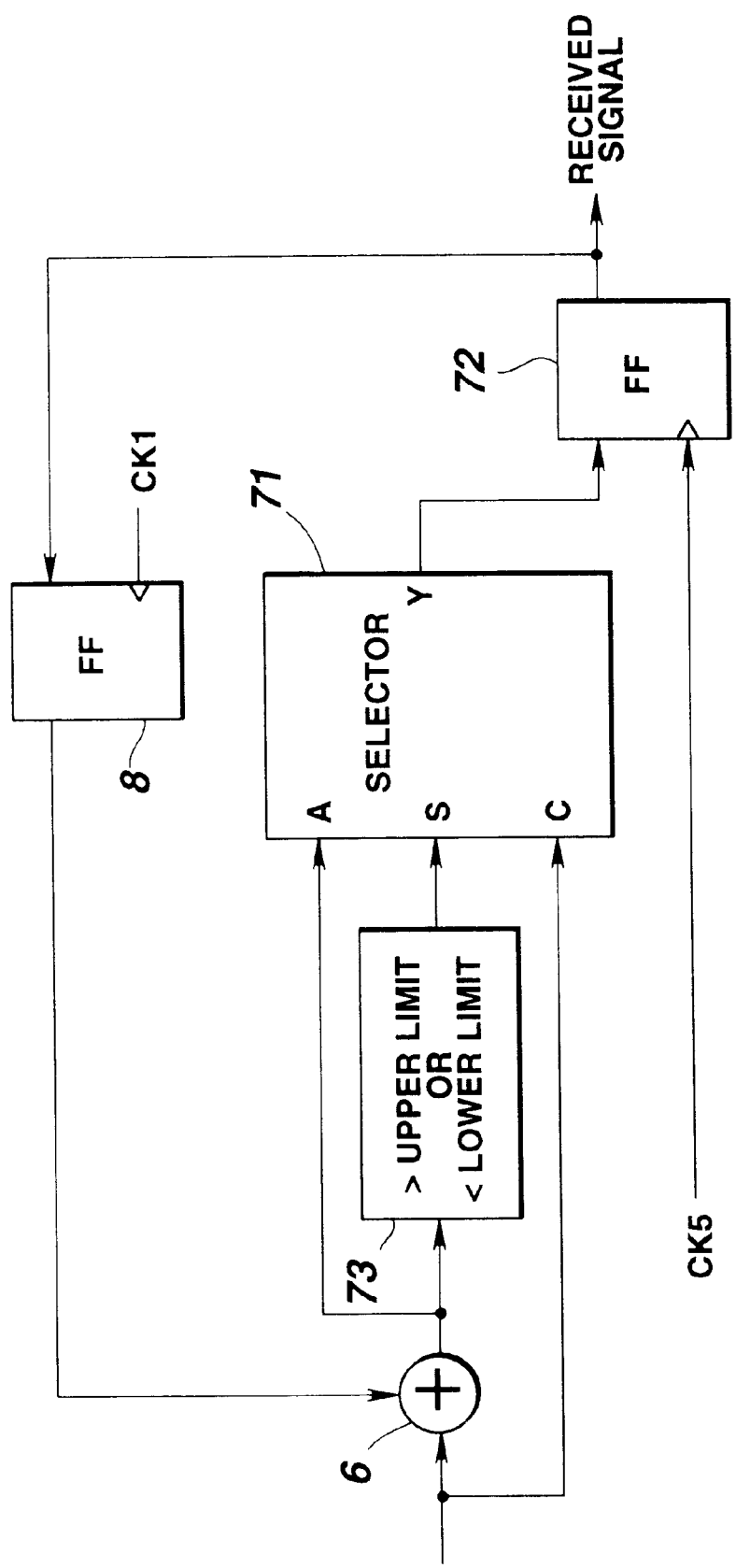
FIG. 2 is a specific constructional example of integrator 6, control circuit 7 and holding circuit 8 of FIG. 1.
Figure 3:
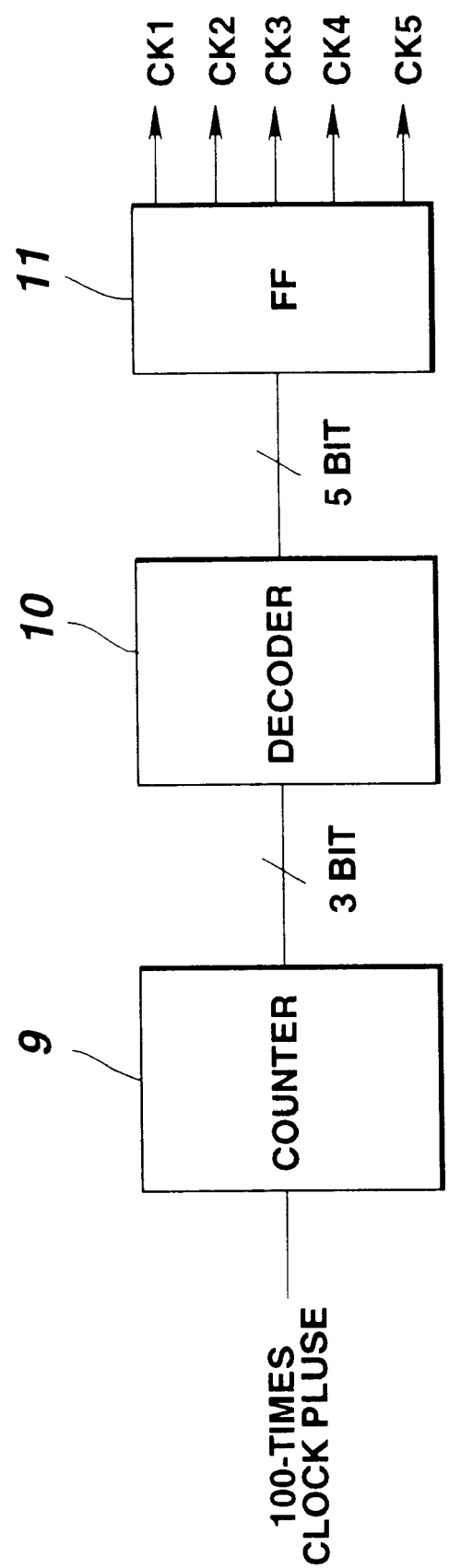
FIG. 3 is an example of a generating circuit for clock pulses CK1 to CK5 of FIG. 1.
Figure 4:
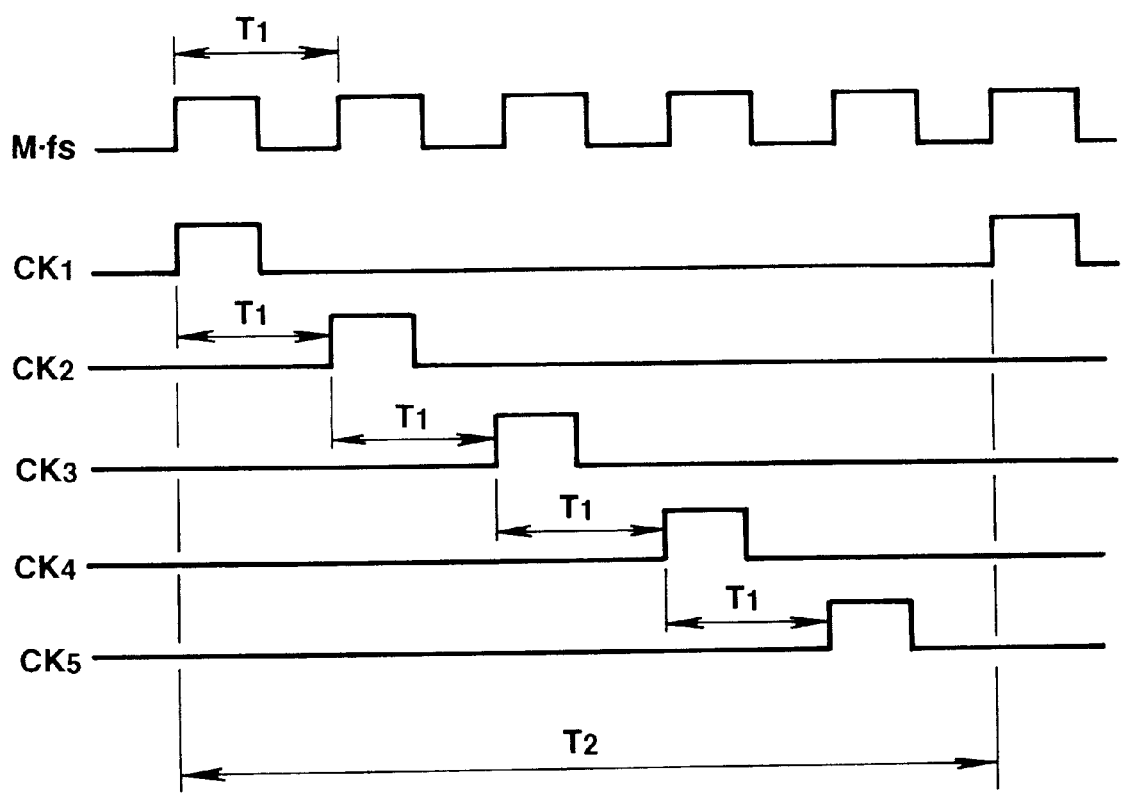
FIG. 4 is a timing chart of clock pulses CK1 to CK5 of FIG. 1.

FIG. 1 to FIG. 3 show functional block diagrams of a digital quadrature detection circuit according to embodiment 1 of the present invention. FIG. 4 shows a timing chart of this circuit.

Figure 5:
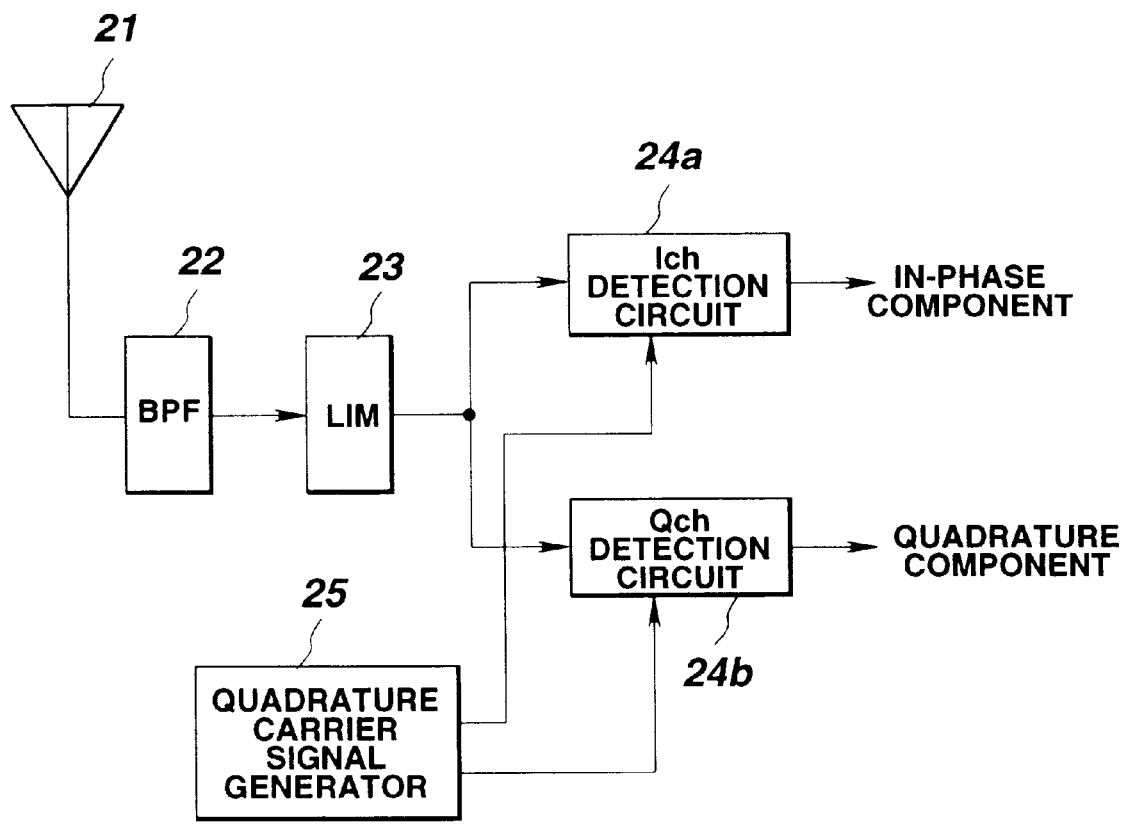
FIG. 5 is a block diagram of a demodulator using the digital quadrature detection circuit of FIG. 1.

Also, FIG. 5 shows a functional block diagram of a demodulator using this digital quadrature detection circuit. In order to facilitate understanding, first of all FIG. 5 will be described. In FIG. 5, Ich (in-phase channel) detection circuit 24a and Qch (quadrature phase channel) detection circuit 24b correspond to the digital quadrature detection circuit of FIG. 1. A signal received by antenna 21 is input to a bandpass filter (BPF) 22. BPF 22 extracts only the signal in the desired band and outputs this to limiter (LIM) 23. The signal whose amplitude is restricted by limiter 23 is input to Ich detection circuit 24a and Qch detection circuit 24b. In quadrature carrier signal generator 25, the reference clock pulse is suitably divided in frequency and distributed and an in-phase reference signal and quadrature reference signal are generated by phase-shifting one of the distributed reference signals by π/2 (90°). In detection circuits 24a, 24b, the received signal from the limiter 23 is subjected to phase comparison with the in-phase reference signal and quadrature reference signal.

Figure 6:
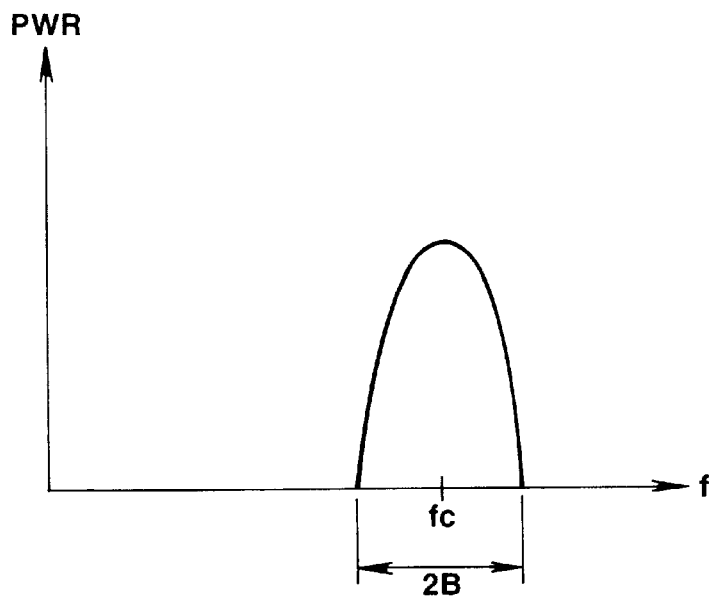
FIG. 6 is an example of the spectrum of an IF signal.

Next, the explanation will be continued using FIG. 1. One input terminal of an exclusive OR (EXOR) gate 1 receives an IF data signal whose amplitude is restricted by limiter 23 of FIG. 5 as described above. The other input terminal receives the quadrature carrier signal which is a reference signal from quadrature carrier signal generator 25. In the case of an Ich digital quadrature detection circuit, the quadrature carrier signal is a signal corresponding to cos ωt; in the case of a Qch digital quadrature detection circuit, the quadrature carrier signal is a signal corresponding to −sin ωt. The center frequency of the IF data signal and quadrature carrier is for example 1.2 MHz. FIG. 6 shows an example of the spectrum of these signals. The spectrum of band 2B is distributed about this center frequency fc (=for example 1.2 MHz).

Figure 7:
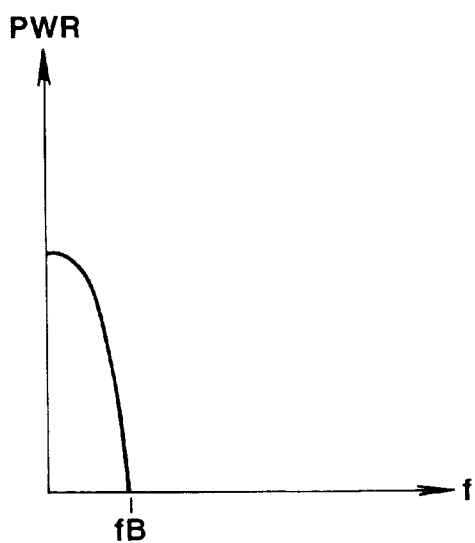
FIG. 7 is an example of the spectrum of a baseband signal.

The output of EXOR gate 1, after being distributed to five branches as shown in FIG. 5, is respectively input to sampling means 2-1 to 2-5. The output of EXOR gate 1 in this case is the baseband signal. FIG. 7 shows an example of the spectrum of the output of EXOR gate 1. The spectrum is distributed up to fB (=for example 192 kHz). In this case B=fB.

Sampling means 2-1 to 2-5 sample the output of EXOR gate 1 (zero IF signal) by means of five 20-times clock signals CK1 to CK5 successively lagging in respective phase, and the outputs of these sampling means 2-1 to 2-5 are delivered to bit adder 3.

The operation of this will now be described using the timing chart of FIG. 4. In FIG. 4, upper-stage clock pulse Mfs is a 100-times clock pulse serving as reference. This is a clock pulse having a frequency (period T1) that is 100 times the maximum frequency of the signals to be handled. For example, if the baseband frequency is 192 kHz, the frequency of the 100 times clock pulse Mfs is 19.2 MHz (period T1=1/19.2 MHz=52 ns). CK1 to CK5 are 20-times clock pulses mutually offset by period T1 in each case. The frequencies of these clock pulses CK1 to CK5 are 3.84 MHz (period T2=1/3.84 MHz=260 ns).

The timing signal shown in FIG. 4 is generated by for example the circuit of FIG. 3. Decoder 10 receives the output of counter 9 that is actuated by a 100-times clock pulse, and generates a pulse at a position corresponding to the output value of the counter. For example, when the output of counter 9 is 1, 2, 3, 4, or 5, decoder 10 generates CK1, CK2, CK3, CK4, or CK5. Flip-flop 11 is provided to prevent noise by shaping the waveform.

Of the output of EXOR gate 1, first of all, the initial portion is sampled by sampling means D1 using CK1. Next, the next portion is sampled by sampling means D2 using CK2, and so on, in sequence. The outputs of these sampling means D1 to D5 are then input to bit adder 3. Bit adder 3 outputs the result of successive addition and the data of this portion are sampled at delay means 4 using CK1. Specifically, data sampled by sampling means D1 to D5 in period T2 are confirmed at the time point of the first CK1 in the next period. This processing is in substance the same as direct sampling by a signal of 100-times frequency. The output of bit adder 3 corresponds to the counter output of a conventional pulse counter system. However, bit adder 3, delay means 4, control circuit 7 and holding circuit 8 are operated by a 20-times clock pulse, so there is no need for a 100-times clock pulse. Consequently, in these elements, the operating frequency can be kept low, so power consumption can be lowered.

Subsequent processing is performed sequentially by delay means 4 to control circuit 7 until the received signal is finally confirmed in control circuit 7 at the last CK5 of the period. Holding circuit 8 holds the signal after confirmation under the control of CK1, and the signal is used in the processing of the next period.

A simple explanation of the processing of delay means 4 and the subsequent stages will now be given. The output of bit adder 3 is input to delay means 4, where the data are delayed corresponding to a period obtained by taking a moving average, and to subtractor 5. Subtractor 5 subtracts the old data from the new data and outputs the result to integrator 6. Control circuit 7 subtracts the output of subtractor 5 from the value held by integrator 6 if the range of calculation of integrator 6 (from 0 up to M×D) is exceeded, result from adding the output of subtractor 5 to the value held by integrator 6 (value of holding circuit 8).

FIG. 2 shows a specific constructional example of the circuitry from integrator 6 to holding circuit 8. Control circuit 7 of FIG. 1 comprises a selector 71, flip-flop circuit (FF) 72 and comparator 73. The output of integrator 6 is input to the A terminal of selector 71. The B terminal of selector 71 inputs the input data of integrator 6 (output data of subtractor 5). On receiving the output of integrator 6, comparator 73 decides whether this is larger than a predetermined upper limit or is smaller than a predetermined lower limit. If one of these conditions is satisfied, comparator 73 outputs a signal to the S terminal of selector 71, causing selector 71 to select the input signal of the C terminal. Otherwise (under ordinary conditions), selector 71 is made to select the input signal of the A terminal. The output of selector 71 (output of the Y terminal) is input to flip-flop circuit 72, where it is held with the timing of clock pulse CK5. The output of flip-flop circuit 72 constitutes the Ich output or Qch output of this digital quadrature detection circuit. At the same time, this output is input to a holding circuit (flip-flop) 8. The output of flip-flop circuit 8 is one input of integrator 6.

Selector 71 and comparator 73 of FIG. 2 are not particularly necessary under ordinary operating conditions of this digital quadrature detection circuit. These circuits are for when the initial condition has become unstable immediately after commencement of operation of the device or for when processing has become unstable due to interruption of the received signal whilst reception is in progress. The provision of these circuits can prevent abnormal operation due to data overflow or underflow.

After delay means 4 to holding circuit 8 above, there is provided a moving average circuit. The moving average functions as a low-pass filter (LPF).

The digital quadrature detection circuit of FIG. 1 can generate scale-of-4 data by using two IQ outputs in combination.

Evaluation of power consumption

In the circuit construction of FIG. 1, the clock pulse frequency was reduced by a factor of ⅕; the diminution in power consumption resulting from this will now be described, The results of comparing the power consumption of a digital quadrature detection circuit as in FIG. 1 with the prior art digital quadrature detection circuit were as follows.

|  | Circuit portion | Power consumption (relative values) |
|---|---|---|
| Prior art circuit | Serial/parallel conv'n | 1.0 |
|  | Moving average | 1.4 |
|  | Total | 2.4 |
| Circuit of FIG. 1 | Parallel sampling | 0.2 |
|  | Moving average | 1.4 |
|  | Total | 1.6 |

As is well known, the power consumption of CMOS increases proportionally to the operating frequency, so, by reducing the clock frequency to ⅕, the power consumption in the portions other than those involved in the moving average can be reduced by 80%. It can be seen that this makes possible a reduction of 30% in terms of the quadrature detection circuit as a whole.

Evaluation of error rate characteristic

Figure 8:
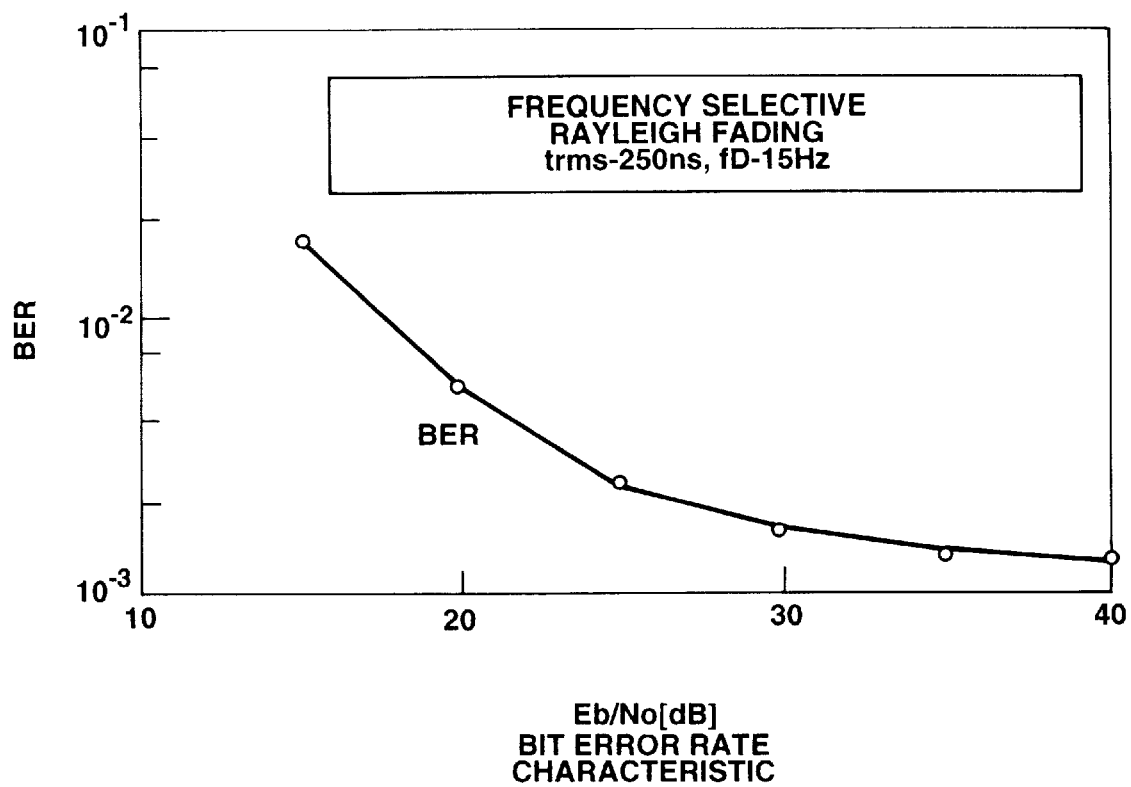
FIG. 8 is a graph showing the bit error rate characteristic in the digital quadrature detection circuit of FIG. 1.

In order to verify the characteristics of the circuit of FIG. 1, a hardware test was conducted using FPGA of the bit error rate under frequency selective fading conditions. The modulation system was π/4 shift QPSK modulation, the waveform shaping a=0.5 route Nyquist, the transmission rate 384 kbit/s, and the demodulation system delayed detection. The fading condition was taken as being a maximum Doppler frequency of 15 Hz, with a delay dispersion (rms) 250 ns. The error rate characteristics obtained are shown in FIG. 8. The same characteristic as with the conventional system is obtained. As can be seen from these results, with the digital quadrature detection circuit of embodiment 1 of the present invention, power consumption can be decreased whilst yet maintaining performance.

With the circuit of embodiment 1 of the present invention, in a digital quadrature detection circuit applicable to a system in which a hard-limited IF signal is input in single-bit quantized form, a 30% reduction in power consumption could be achieved. Furthermore, by carrying out a hardware test using FPGA, it was found that an error rate characteristic identical to that of the conventional system was obtained under frequency selective fading conditions.

Study of multiples of clock pulse

In FIG. 1, there were five sampling means 2. This is because an output signal of the quadrature detection circuit of about 20 times the symbol rate, and an input signal of time resolution about 100 times the symbol rate are necessary in order to avoid degradation of the error rate characteristic of the demodulator. There are therefore five sampling means in this case, since 100/20=5. If there are four delay means, the time resolution of the input signal drops by about 80 times (80/20=4) or the time resolution of the output signal rises by about 25 times (100/25=4).

If the number of delay means is increased, the time resolution of the input signal is raised or the time resolution of the output signal falls. Also, by increasing the quantization bit number of the bit adder, circuitry is increased corresponding to this increase and power consumption is increased. However, if the time resolution with respect to the input signal is kept constant, the operating rate of the subsequent circuits of the quadrature detection circuit can be lowered.

Also, although the error rate characteristic of the demodulator can be improved by raising the time resolution by increasing the clock pulse multiple, the characteristic is not in fact very much different for multiples above 100. On the other hand, by making the multiple of the frequency division clock pulse 20 times, i.e. by decreasing it, the power consumption can be decreased.

If the clock pulse multiple is taken as 100 times, there are seven multiples of frequency division that may be considered namely, 2, 4, 5, 10, 20, 25 and 50, if the frequency division relationship is to be an integer. The following cases may be considered, by way of example, in order to select a practical multiple of the frequency division clock from these.

(1) 10 times

In this case, there are 10 delay means. In this case, the time resolution of the input signal is raised to about 200 times, or the time resolution of the output signal is lowered by a factor of about 10. Power consumption is increased by increasing the number of delay means, but power consumption is diminished by lowering the operating frequency.

(2) 20 times (case of FIG. 1)

(3) 25 times

In this case, there are four delay means. In this case, either the time resolution of the input signal is lowered to about 80 times or the time resolution of the output signal is raised to about 25 times. Power consumption is diminished by decreasing the number of delay means, but power consumption is increased by increasing the operating frequency.

If the clock pulse multiple is made 96 times (@100), taking into consideration the need to have an integral frequency division relationship, the available multiples of frequency division are 10 in number, namely, 2, 3, 4, 6, 8, 12, 16, 24, 32, and 48. Selecting practical multiples of the frequency division clock pulse from among these, the possibilities include for example 8, 12, 16, and 24. Consequently, a relationship is possible wherein the clock pulse multiple is 96 and the frequency division clock pulse multiple is 16. Of course, other numerical values apart from 96 and 100 could be adopted as clock pulse multiple. The number of different frequency division multiples available is larger when the clock pulse multiple is such that the results of its decomposition into prime factors are of the form of powers.

As can be seen from the above discussion, the clock pulse multiple relationship (number of delay means) is not fixed, and, by specific design conditions, it is possible to select a suitable optimum numerical value enabling restriction of the power consumption of the circuit and time resolution of the input signal (or time resolution of the output signal).

What is claimed is:

1. A digital quadrature detection circuit comprising:

a quasi-synchronous detector for finding an exclusive logical sum of a binary-converted intermediate frequency and a carrier signal;

conversion means for converting an output of said quasi-synchronous detector to an M-bit parallel signal by respectively sampling at M phases (where M is an interger of 1 or more) for each symbol;

a low-pass filter for extracting low frequency components from the output of said conversion means; and timing generating means for generating an operating timing signal and supplying this to said conversion means and said low-pass filter, said low-pass filter including delay means for, on receiving the output of said conversion means, delaying the signal corresponding to a prescribed period;

a subtractor for subtracting the output of said delay means for the output of said conversion means;

an integrator for integrating the output of said subtractor;

a holding circuit for holding the output of said integrator; and a control circuit for correcting the output of said integrator when a result of the integrating by said integrator exceeds a predetermined range.

2. A digital quadrature detection circuit according to claim 1, wherein said control circuit, when the result of the calculation of said integrator exceeds a predetermined range, subtracts the output of said subtractor from the value held by said holding circuit.

3. A digital quadrature detection circuit according to claim 1, wherein said control circuit, when the result of the calculation of said integrator exceeds a predetermined range, holds the output of said subtractor in said holding circuit.

4. A digital quadrature detection circuit according to claim 1, wherein said control circuit comprises a selector circuit for selecting and outputting the output of said integrator or the input of said calculator based on the output of said comparator; a flip-flop circuit for holding the output of said selector circuit; and a comparator for comparing the result of the calculation of said integrator with a predetermined value.

* * * * *